(12) United States Patent
Shajii et al.

(10) Patent No.: US 7,121,139 B2
(45) Date of Patent: Oct. 17, 2006

(54) THERMAL MASS FLOW RATE SENSOR HAVING FIXED BYPASS RATIO

(75) Inventors: Ali Shajii, Canton, MA (US); Paul Meneghini, Haverhill, MA (US); Daniel Alexander Smith, Andover, MA (US)

(73) Assignee: MKS Instruments, Inc., Wilmington, MA (US)

( * ) Notice: Subject to any disclaimer, the term of this patent is extended or adjusted under 35 U.S.C. 154(b) by 0 days.

(21) Appl. No.: 10/987,718

(22) Filed: Nov. 12, 2004

(65) Prior Publication Data

US 2006/0101907 A1 May 18, 2006

(51) Int. Cl.
*G01F 1/68* (2006.01)
(52) U.S. Cl. .................. 73/202.5; 73/204.27
(58) Field of Classification Search ........... 73/202, 73/202.5, 861.52, 204.21
See application file for complete search history.

(56) References Cited

U.S. PATENT DOCUMENTS

| | | | |
|---|---|---|---|
| 4,433,575 A | 2/1984 | Rutherford et al. | |
| 4,522,058 A | 6/1985 | Ewing | |
| 5,114,447 A | 5/1992 | Davis | |
| 5,295,394 A | 3/1994 | Suzuki | |
| 5,332,005 A | 7/1994 | Baan | |
| 5,750,892 A | 5/1998 | Huang et al. | |
| 5,804,717 A * | 9/1998 | Lucas ........................ | 73/202 |
| 5,824,894 A | 10/1998 | Lucas et al. | |
| 6,119,730 A | 9/2000 | McMillan | |
| 6,422,256 B1 | 7/2002 | Balazy et al. | |
| 6,719,947 B1 | 4/2004 | Jha et al. | |
| 2003/0115950 A1 | 6/2003 | Ambrosina et al. | |

OTHER PUBLICATIONS

*High Purity Porous Metal Flow Restrictor*, www.moticorp.com.
*Molbloc/molbox Gas Flow Standards*, www.dhinstruments.com.
*Porous Metal Design Guidebook*, www.mpif.org.
*Precision Mass Flow Metering for CVD Applications*, www.bronkhorst.com.
PCT International Search Report for related PCT Application No.: PCT/US05/039151, 3 pages.
PCT Written Opinion of the International Searching Authority for related PCT Application No.: PCT/US05/039151, 7 pages.

* cited by examiner

*Primary Examiner*—Harshad Patel
(74) *Attorney, Agent, or Firm*—McDermott Will & Emery LLP

(57) ABSTRACT

A flow rate sensor includes a main conduit, a sensor tube and a bypass tube connecting an upstream portion of the main conduit to a downstream portion of the main conduit such that flow through the main conduit is divided through the sensor tube and the bypass tube, and at least one heater element for heating the sensor tube. A first flow restrictor of porous media is positioned between the upstream portion of the main conduit and the sensor tube, and a second flow restrictor of porous media is positioned between the upstream portion of the main conduit and the bypass tube. The flow restrictors provide the flow rate sensor with a fixed bypass ratio so that the sensor can operate independently of the type of gas being measured.

27 Claims, 3 Drawing Sheets

THERMAL MASS FLOW RATE SENSOR HAVING FIXED BYPASS RATIO

FIELD OF THE INVENTION

The present disclosure relates to mass flow rate sensors, and more particularly, to a thermal based mass flow rate sensor having a sensor tube and at least one bypass tube, wherein the bypass tube and the sensor tube contain porous media that provide the sensor with a fixed bypass ratio.

BACKGROUND OF THE DISCLOSURE

In the semiconductor manufacturing industry, it is necessary to achieve precise control of the quantity, temperature and pressure of one or more reactant materials which are delivered in a gaseous state to a reaction chamber. Mass flow controllers are widely used in the semiconductor manufacturing industry to control the delivery of process reactants. In FIG. 1 there is shown an example of a typical mass flow rate controller (MFC). The MFC generally includes a mass flow rate sensor (which includes a sensor tube and bypass tube, as described below) for measuring the rate of flow of gas through the MFC, a valve for controlling the flow of gas through the MFC and a simple control circuit or a computer mounted on a P.C. board and connected to the mass flow rate sensor and the valve. The computer is programmed with a desired flow rate through a connector, for example, which the computer compares to an actual flow rate as measured by the mass flow rate sensor. If the actual flow rate does not equal the desired flow rate, the computer is further programmed to open or close the valve until the actual flow rate equals the desired flow rate.

Thermal mass flow sensors operate on the principle of conservation of thermal energy, where power applied to a flowing gas equals the mass flow rate of the gas multiplied by the specific heat of the gas, the density of the gas and the temperature change of the gas. The mass flow rate can therefore be determined if the properties of the gas, the temperature changes of the gas, and the rate of power applied to the gas are known.

One class of thermal mass flow rate sensors employs a sensor tube as the primary sensing mechanism, as shown in the exemplary prior art mass flow rate sensor 10 of FIGS. 1 and 2. In such a device, a sensor tube 12 diverts a portion 14 of the main flow 16 passing through a primary conduit 18 of the MFC, while the remainder of the flaw passes through a bypass tube 18a that includes a laminar flow element 22. It is important to note that this figure is not necessarily to scale. Typically the sensor tube 12 is significantly smaller than the primary conduit 18, but is shown somewhat large in FIG. 2 for clarity, Generally one or more heating elements 20 attach tote sensor tube 12 to allow a heat transfer from the heating elements 20, through the tube 12 and to the fluid. The heating elements 20 also serve as resistance tenperature sensors that track the local temperature of the wall of the sensor tube 12.

The increase in gas temperature between the two heating elements 20 is a function of the mass flow rate of the gas through the sensor tube 12, the specific heat of the gas, the density of the gas, and the power delivered to the heater elements 20. A circuit converts the difference in resistance (or temperature) of the two elements 20 into a voltage output (power) which is calibrated to known flow rates. Normally, the change in resistance is converted to voltage by a Wheatstone bridge, which is connected to the processor. The processor compares the voltage level to stored reference gas calibration data to determine the flow rate. The stored reference gas calibration data, or table, includes voltages produced by the sensor for a range of known flow rates of the reference gas.

Since the calibration data changes for gases other than the reference gas, a characterization of the calibration data is required for each type of gas being measured in the sensor tube 12, in order for the resulting measurement to be accurate. This characterization is also referred to as multi-gas correction functions. The multi-gas correction function is the ratio of flows, in the sensor tube 12 only, of the new gas over the reference gas (Qnew/Qref). This ratio changes with sensor voltage. The calibration table of the reference gas is simply a list of sensor voltages and measured total flows at those voltages. To obtain the calibration table in the new gas, the flow of the reference gas is multiplied by the multi-gas correction function at each voltage in the reference gas calibration table. The multi-gas correction function is meant to make the sensor tube 12 independent of the type of gas being measured.

The multi-gas correction function assumes that a bypass ratio is the same in both the reference gas and the gas being measured. The bypass ratio $\eta$ (also referred to as split ratio) of the sensor 10 is defined as the total flow through the bypass tube 18a and the sensor tube 12, $Q_{total}$ divided by flow through just the sensor tube 12, $Q_{sensor}$.

$$BypassRatio \equiv \eta = \frac{Q_{Total}}{Q_{sensor}} = \frac{Q_{sensor} + Q_{bypass}}{Q_{sensor}} \quad (1)$$

In a multi-gas application, $\eta$ must be equal for all gases. Any change in $\eta$ from that of the reference gas is defined as the multi-gas bypass ratio error $\epsilon_{bp}$ for that gas.

$$MulitgasBypassRatioError \equiv \epsilon_{bp} = \left(\frac{\eta - \eta_{ref}}{\eta_{ref}}\right) \quad (2)$$

$\epsilon_{bp}$ translates directly into a calibration error for the new gas. The bypass tube 18a is normally designed to minimize this error.

The multi-gas bypass ratio error $\epsilon_{bp}$ occurs because the bypass ratio $\eta$ changes for different gases because of pressure losses, such as entrance effects, caused by non-ideal geometric conditions of the primary conduit, the bypass tube and the sensor tube. These pressure losses are often referred to as "Reynolds Losses" because the losses are a function of the Reynolds number of the gas being measured. The Reynolds Losses can be a major source of error in measuring the gas flow. The Reynolds losses are normally minimized or eliminated so that the bypass ratio $\eta$ remains constant for different gases by properly designing the bypass tube 18a and the sensor tube 12. Properly designing the bypass tube 18a, however, often results in a complex, relatively large and expensive sensor 10, especially at high flow ranges.

It is an object of the present disclosure to provide a new and improved thermal mass flow rate sensor which can be used with different gases. Preferably, the new and improved thermal mass flow rate sensor will be substantially independent of gas properties (i.e., characterization of the bypass ratio will not be required for each type of gas being measured in the mass flow rate sensor). In addition, the new and improved thermal mass flow rate sensor also will preferably be relatively simple in design, inexpensive to manufacture, and compact in size.

SUMMARY OF THE DISCLOSURE

The present disclosure provides a new and improved thermal mass flow rate sensor. The sensor includes a main conduit including an upstream portion and a downstream portion, a sensor tube and a bypass tube connecting the upstream portion of the main conduit to the downstream portion of the main conduit such that flow through the main conduit is divided through the sensor tube and the bypass tube, and at least one heater element for heating the sensor tube. The sensor also includes a first flow restrictor positioned between the upstream portion of the main conduit and the sensor tube, and a second flow restrictor positioned between the upstream portion of the main conduit and the bypass tube.

According to one aspect of the present disclosure, the flow restrictors comprise porous media.

Among other features and benefits, the mass flow rate sensor of the present disclosure operates substantially independently of gas properties since the flow restrictors provide the flow sensing apparatus with a fixed flow ratio. In addition, the mass flow rate sensor of the present disclosure is relatively simple in design, inexpensive to manufacture, and compact in size.

BRIEF DESCRIPTION OF THE DRAWINGS

The foregoing and other objects of this disclosure, the various features thereof, as well as the disclosure itself, may be more fully understood from the following description, when read together with the accompanying drawings in which.

Elements having the same reference character designations represent like elements throughout the drawings.

DETAILED DESCRIPTION OF EXEMPLARY EMBODIMENTS

Figure 1:
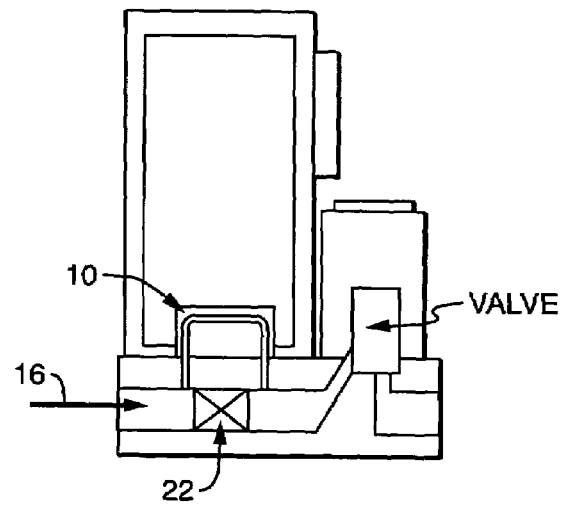
FIG. 1 is a diagram of an exemplary embodiment of a mass flow controller including a mass flow rate sensor constructed in accordance with the prior art.
Figure 2:
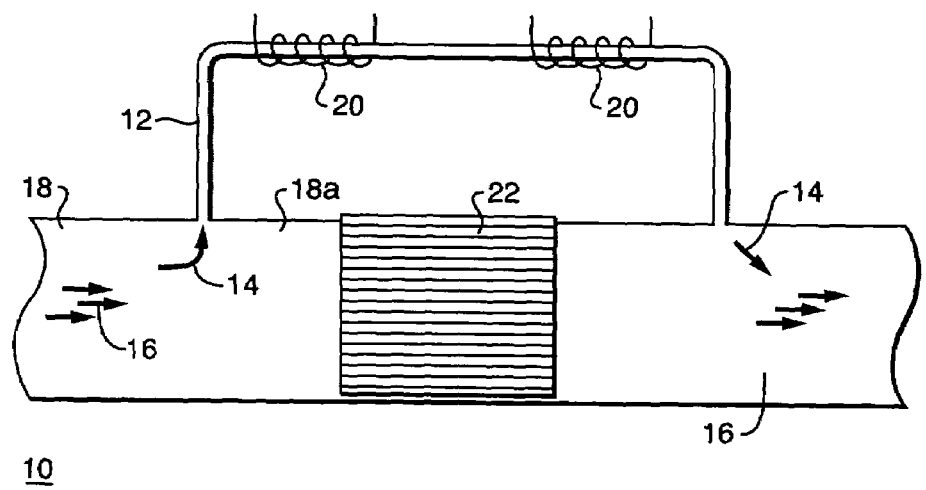
FIG. 2 is an enlarged sectional view of a portion of the flow rate sensor of FIG. 1 showing a main conduit, a sensor tube, a bypass tube and a laminar flow element of the flow rate sensor.
Figure 3:
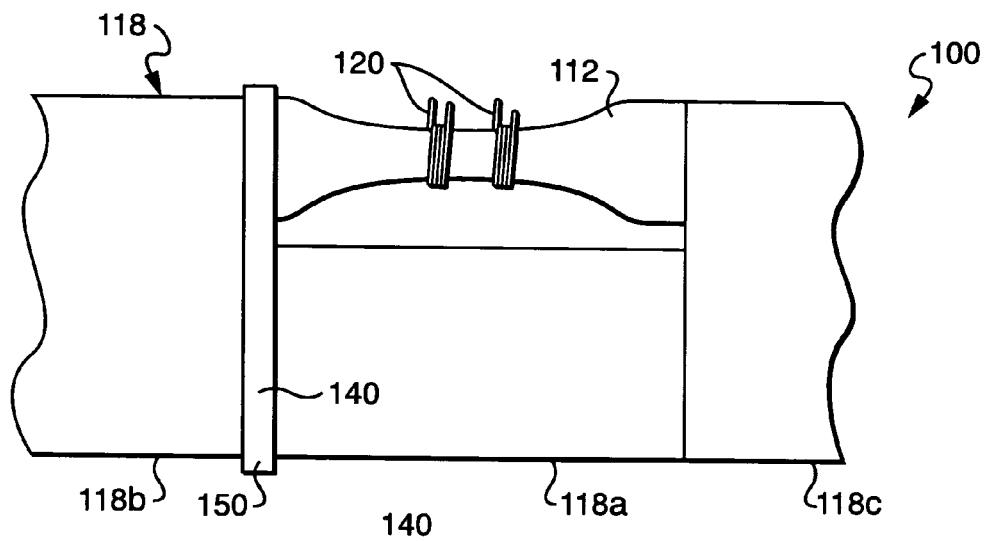
FIG. 3 is a side elevation view of a portion of an exemplary embodiment of a mass flow rate sensor constructed in accordance with the present disclosure and including a main conduit, a sensor tube and a bypass tube.
Figure 4:
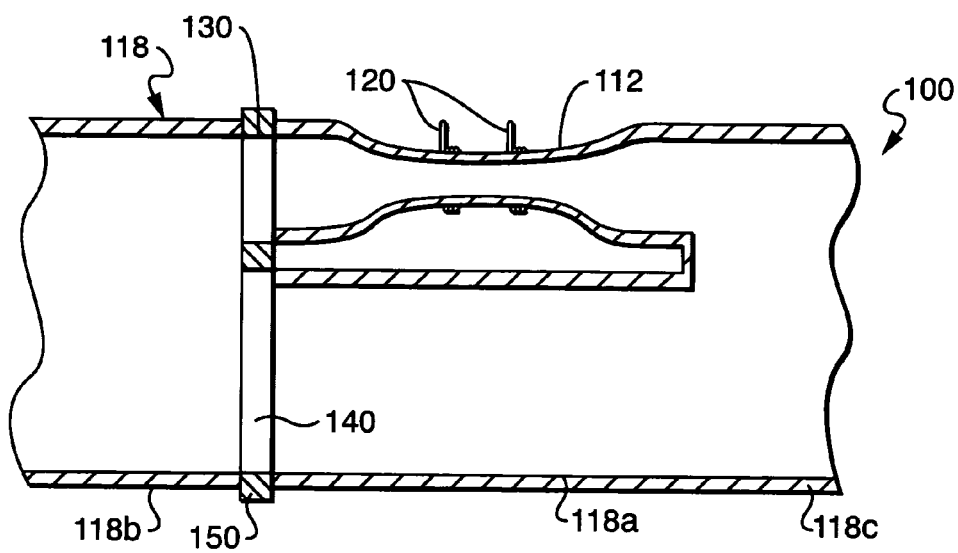
FIG. 4 is a sectional view of the mass flow rate sensor of FIG. 3, further showing a first flow restrictor positioned between the main conduit and the sensor tube and a second flow restrictor positioned between the main conduit and the bypass tube.

Referring to the drawings, FIGS. 3 and 4 show an exemplary embodiment of a flow rate sensor 100 constructed in accordance with the present disclosure. The flow rate sensor 100 can be used as part of a mass flow rate controller, such as the mass flow rate controller shown in FIG. 1. In such an application, the flow rate sensor 100 of the present disclosure replaces the flow rate sensor 10 shown in FIGS. 1 and 2. The present disclosure is also directed to a method of measuring flow and a method of controlling flow using the flow rate sensor 100 of FIGS. 3 and 4.

Among other features and benefits, the mass flow rate sensor 100 of the present disclosure operates substantially independently of gas properties. In addition, the mass flow rate sensor 100 of the present disclosure is relatively simple in design, inexpensive to manufacture, and compact in size.

In general, the flow rate sensor 100 includes a main conduit 118 including an upstream portion 118b and a downstream portion 118c, a sensor tube 112 and a bypass tube 118a connecting the upstream portion 118b of the main conduit 118 to the downstream portion 118c of the main conduit 118 such that flow through the main conduit 118 is divided through the sensor tube 112 and the bypass tube 118a. It should be noted that the figures are not to scale and the sensor tube 112 is significantly smaller than the primary conduit 118, but is shown somewhat large in the figures for clarity. The sensor 100 also includes at least one heater element 120 for heating the sensor tube 112, a first flow restrictor 130 positioned between the upstream portion 118b of the main conduit 118 and the sensor tube 112, and a second flow restrictor 140 positioned between the upstream portion of the main conduit and the bypass tube 118a.

According to one embodiment of the present disclosure, the first and the second flow restrictors 130, 140 comprise porous media. Suitable porous media is available, for example, from Mott Corporation of Farmington, Conn. (http://www.mottcorp.com).

By altering shape (e.g., thickness and cross-sectional area) and porosity of the first and the second porous media flow restrictors 130, 140, the flow rates through the bypass tube 118a and the sensor tube 112 can be varied. According to one exemplary embodiment, the porous media of the first and the second flow restrictors 130, 140 is made from sintered metal. The sintered metal can be formed from metal powder having a pre-sintered mean particle size of less than 20 microns. According to another embodiment, the mean particle size of the sintered elements are less than 10 microns and the sintered metal has a density of at least 5 g/cc.

The metal used to make the first and the second porous media flow restrictors 130, 140 is selected from, but not limited to, a group consisting of stainless steel, nickel and nickel alloys, and titanium, to meet special requirements, such as greater temperature and corrosion resistance. In particular, the metals and alloys include, but are not limited to, Stainless Steel 316L, 304L, 310, 347 and 430, Hastelloy C-276, C-22, X, N, B and B2, Inconel 600, 625 and 690, Nickel 200 and Monel® 400 (70 Ni-30 Cu), Titanium, and Alloy 20.

As previously discussed in the background section, the bypass ratio η (also referred to as split ratio) of the flow sensor 100 is equal to the amount of fluid flowing through the sensor 100, $Q_{sensor}$, to the amount of fluid flowing through the sensor tube 112, $Q_{sensor\ tube}$. In a multi-gas application, η must be equal for all gases. Any change in η from that of the reference gas is defined as the multi-gas bypass ratio error $\epsilon_{bp}$ for that gas. $\epsilon_{bp}$ translates directly into a calibration error for the new gas. The sensor 100 of the present disclosure is designed to minimize this error.

For simple geometries, the Navier-Stokes equation for incompressible laminar flow in a duct can be solved in closed form for fully developed, incompressible and steady flow with constant cross section. The solution for flow $Q_{tube}$ through a tube equals, $$Q_{tube} = \frac{\pi}{8\mu}\left(\frac{-dp}{dx}\right)r_{tube}^4 \quad (3)$$

Where $\mu$ is the viscosity of the gas, and $r_{tube}$ is the radius of the sensor tube 112. If the cross section is constant, the pressure term is linear.

$$\left(\frac{dp}{dx}\right) = \frac{\Delta p_{tube}}{L_{tube}} \quad (4)$$

Where $L_{tube}$ is the length of the tube and $\Delta p_{tube}$ is the change of pressure of the gas over the length $L_{tube}$ of the tube. $\Delta p_{tube}$ is calculated by combining equations 3 and 4:

$$\Delta p_{tube} = Q_{tube}(8\,\mu L_{tube}/\pi r_{tube}^4) \quad (5)$$

Fluid flow $Q_{pm}$ through a porous media flow restrictor is described by the Brinkman equation, which can also be solved in closed form assuming incompressible and steady flow with constant cross section:

$$\Delta p_{pm} = Q_{pm}(\mu t_{pm}/A_{pm}k_{pm}) \quad (6)$$

Where $\Delta p_{pm}$ is the pressure drop through the porous media flow restrictor, $t_{pm}$ is the thickness of the porous media flow restrictor, $A_{pm}$ is the cross-sectional area of the porous media flow restrictor, and $k_{pm}$ is the permeability of the porous media flow restrictor.

For the sensor 100, the porous media flow restrictors, 130 and 140, are in series with the tubes 112 and 118a, respectively. Therefore, the flow through the porous flow restrictors 130 and 140 is equal the flow through the tubes 112 and 118a, respectively:

$$Q_{sensor}Q_{130}=Q_{112}$$

$$Q_{bypass}=Q_{140}=Q_{140} \quad (7)$$

The pressure drop across the sensor 100 is equal to the pressured drop of the tube plus the pressure drop of the porous filter for each flow path through the sensor:

$$\Delta p_{100} = \Delta p_{112} + \Delta p_{130} = \Delta p_{118} + \Delta p_{140} \quad (8)$$

An expression for the bypass ratio $\eta$ can then be found by substituting equations 3–8, as appropriate, into equation 1 (shown in the background section of this disclosure) to get:

$$\eta = \left[1 + \frac{8L_{120}/\pi r_{120}^4 + t_{130}/A_{130}k_{130}}{8L_{118a}/\pi r_{118a}^4 + t_{140}/A_{140}k_{140}}\right] \quad (9)$$

The above equations can be used to design porous media flow restrictors 130, 140 that make the flow sensor 100 substantially independent of gas properties. (In particular, the porous media makes the bypass tube 118a substantially independent of gas properties, while the multi-gas correction functions make the sensor tube 112 substantially independent of gas properties.) The only potential error source is the assumption of fully developed flow in equation 3. In reality, however, the sensor tube 112 will have a pressure loss caused by entrance effects. To negate the pressure drop in the sensor tube 112, the first porous media flow restrictor 130 is designed so that the pressure drop $\Delta p_{130}$ through the first porous media flow restrictor is much larger than the pressure drop $\Delta p_{112}$ through the sensor tube 112. While the entrance effect is known to be a function of Reynolds number, a closed form solution for the entrance effect does not exist and must be determined either experimentally or numerically. The mass flow rate sensor of the present disclosure operates substantially independently of gas properties since the porous media flow restrictors 130, 140 provide the flow sensor 100 with a fixed bypass ratio.

Figure 6:
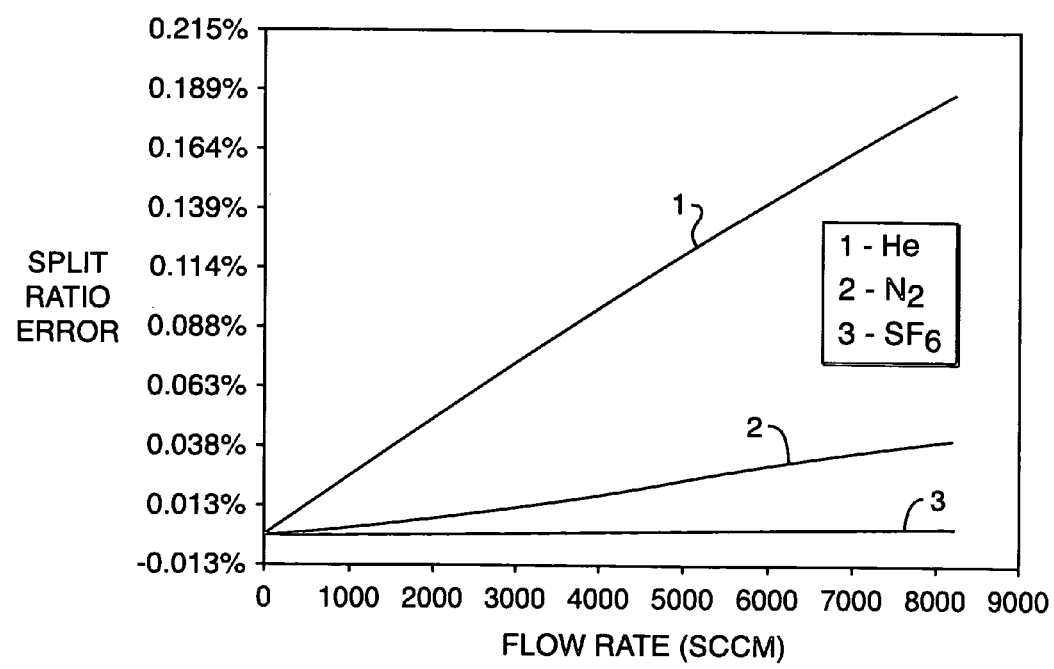
FIG. 6 is a graph illustrating multiple gas bypass ratio errors for three gases versus flow rate for a mass flow rate sensor constructed in accordance with the present disclosure.

A graph in FIG. 6 shows the results of a finite element model of the flow of three different gases through a flow sensor 100 constructed in accordance with the present disclosure. This model solves the 3-D incompressible Navier-Stokes equation in the upstream portion 118b of the main conduit 118 and the downstream portion 118c of the main conduit 118, and the 3-D incompressible Brinkman equation through the porous media flow restrictors 130, 140. The results clearly show that changes in the split ratio error are very small across a wide range of flow for each of the gases. The changes that do occur correlate with the Reynolds number of the gas.

Figure 5:
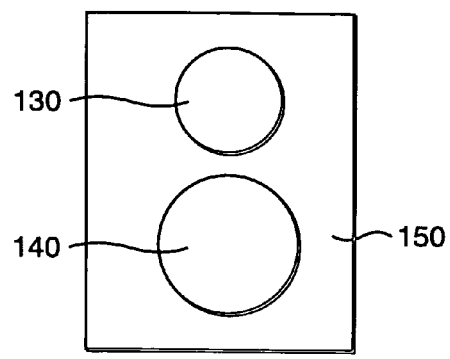
FIG. 5 is an enlarged end elevation view of the first and the second flow restrictors.

In the exemplary embodiment shown, the first and the second porous media flow restrictors 130, 140 are provided as disks that are pressed into openings in a metal plate 150, which is shown in FIG. 5. The metal plate 150, in turn, is positioned between the sensor tube 112 and the bypass tube 118a and the upstream portion 118b of the main conduit 118, as shown in FIGS. 3 and 4.

In the exemplary embodiment shown, the heater element comprises an upstream resistance coil 120 and a downstream resistance coil 120. Although not shown, the coils are connected to a Wheatstone bridge. Heat transfer between fluid flowing in the sensor tube 112 from the tube walls is a function of the difference between the fluid temperature and the wall temperature, and the heat transfer rate coefficient inside of the tube. The increase in gas temperature between the two coils 120 is a function of the mass flow rate of the gas through the sensor tube 112 and the specific heat of the fluid. The Wheatstone bridge converts the difference in resistance (or temperature) of the two coils 120 into a voltage output which is calibrated to a known flow source.

Although not shown, a mass flow rate sensor 100 of the present disclosure can be incorporated into a mass flow controller, for example. A mass flow controller generally includes the mass flow rate sensor for measuring the rate of flow of gas through the controller, a valve for controlling the flow of gas through the controller and a computer connected to the mass flow rate sensor and the valve. The computer is programmed with a desired flow rate, which the computer compares to an actual flow rate as measured by the mass flow rate sensor. If the actual flow rate does not equal the desired flow rate, the computer is further programmed to open or close the valve until the actual flow rate equals the desired flow rate.

The present disclosure may be embodied in other specific forms without departing from the spirit or essential characteristics thereof. The exemplary embodiments describe herein are therefore to be considered in respects as illustrative and not restrictive, the scope of the disclosure being indicated by the appended claims rather than by the foregoing description. All changes which come within the meaning and range of the equivalency of the claims are therefore intended to be embraced therein.

What is claimed is:

1. A flow rate sensor, comprising:
   a main conduit including an upstream portion, a downstream portion, and an intermediate portion disposed between and in series with the upstream and downstream portions, wherein the intermediate portion includes a sensor tube and a bypass tube disposed and oriented so as to be parallel to one another such that flow through the main conduit is divided between the sensor tube and the bypass tube;
   at least one heater element for heating the sensor tube;
   a first porous media flow restrictor positioned between the upstream portion of the main conduit and the sensor tube; and
   a second porous media flow restrictor positioned between the upstream portion of the main conduit and the bypass tube.

2. A sensor according to claim 1, wherein the porous media comprises sintered metal.

3. A sensor according to claim 2, wherein the sintered metal is formed from metal powder having a pre-sintered mean particle size is less than 20 microns.

4. A sensor according to claim 3, wherein the the pre-sintered mean particle size is less than 10 microns.

5. A sensor according to claim 2, wherein the sintered metal has a density of at least 5 g/cc.

6. A sensor according to claim 2, wherein the sintered metal is selected from the group consisting of stainless steel, nickel and nickel alloys, and titanium.

7. A sensor according to claim 1, wherein the heather element comprises an upstream resistance coil and a downstream resistance coil.

8. A sensor according to claim 1, wherein the coils are connected to a Wheatstone bridge.

9. A mass flow controller including a flow rates sensor according to claim 1, and further including:
   a valve for controlling mass flow through the main conduit of the flow rate sensor; and
   a processor connected to the flow rate sensor and the valve and programmed to receive a desired flow rate, compare the desired flow rate to an actual flow rate as measured using the flow rate sensor, and, if the actual flow rate does not equal the desired flow rate, operate the valve until the actual flow rate equals the desired flow rate.

10. A sensor according to claim 1, wherein the first and second porous media flow restrictors have permeabilities that are substantially the same.

11. A sensor according to claim 1, wherein the first and second porous media flow restrictors have thicknesses that are substantially the same.

12. A sensor according to claim 1, wherein the first and second porous media flow restrictors have cross-sectional flow areas that are substantially the same.

13. A sensor according to claim 1, wherein the first and second flow restrictors each include a central plane that are located substantially within the same plane.

14. A sensor according to claim 13, wherein the first and second flow restrictors include first and second disks, respectively, wherein the firstand second disks are disposed in first and second openings, respectively, of a metal plate positioned between (i) the upstream portion of the main conduit and (ii) the intermediate portion, and wherein the first flow restrictor connects the upstream portion of the main conduit to to the sensor tube and the second flow restrictor connects the upstream portion of the main conduit to the bypass tube.

15. A method of measuring a fluid flow rate, comprising:
   providing a main conduit having an upstream portion, a downstream portion, and an intermediate portion connected between and in series with the upstream and downstream portions,
   wherein the intermediate portion includes a sensor tube and a bypass tube configured and oriented so as to be parallel to one another;
   dividing a fluid flow through the main conduit into the sensor tube and the bypass tube;
   heating the sensor tube;
   restricting flow in the sensor tube using a first porous media flow restrictor; and
   restricting flow in the main conduit and the bypass tube using a second porous media flow restrictor.

16. A method according to claim 15, wherein the porous media comprises sintered metal.

17. A method according to claim 16, wherein the sintered metal is formed from metal powder having a pre-sintered mean particle size of less than 20 microns.

18. A method according to claim 17, wherein the mean particle size of the sintered elements is less than 10 microns.

19. A method according to claim 16, wherein the sintered metal has a density of at least 5 g/cc.

20. A method according to claim 16, wherein the sintered metal is selected from the group consisting of stainless steel, nickel and nickel alloys, and titanium.

21. A method according to claim 15, wherein the sensor tube is heated using an upstream resistance coil and a downstream resistance coil.

22. A method according to claim 21, wherein the coils are connected to a Wheatstone bridge.

23. A method according to claim 15, wherein the first and second flow restrictors each include a central plane further including locating the central planes of the first and second flow restrictors within substantially the same plane.

24. A method according to claim 23, wherein the first and second flow restrictors includes first and second disks, respectively, and wherein locating the central planes of the first and second flow restrictors within the same plane includes disposing the first and second disks in first and second openings, respectively, of a metal plate positioned between (i) the upstream portion of the main conduit and (ii) the intermediate portion, such that the first flow restrictor connects the upstream portion of the main conduit to the sensor tube and the second flow restrictor connects the upstream portion of the main conduit to the bypass rube.

25. A method for controlling a mass flow of a fluid, comprising:
   providing a main conduit for receiving the flow of fluid, the main conduit including an upstream portion, a downstream portion, and an intermediate portion connected between and in series with the upstream and downstream portions, wherein the intermediate portion includes a sensor tube and a bypass tube configured and oriented so as to parallel to one another; dividing a fluid flow main conduit into the sensor tube and the bypass tube;
   restricting flow between the upstream portion of the main conduit and the sensor tube using a first flow restrictor comprising a porous media;
   restricting flow between the upstream portion of the main conduit and the bypass tube using a second flow restrictor comprising a porous media;

receiving a desired total rate of mass flow in the main conduit at a location upstream of the upstream portion;

measuring a rate of mass flow through the sensor tube and the bypass tube using known reference gas flow versus voltage calibration data;

comparing the desired total rate of mass flow to the actual total rate of mass flow; and adjusting the rate of fluid flow through the main conduit until the actual rate of mass flow equals the desired rate of mass flow.

26. A method according to claim 25, wherein the first and second flow restrictors each include a central plane, further including locating the central planes of the first and second flow restrictors within substantially the same plane.

27. A method according to claim 26, wherein the first and second flow restrictors includes first and second disks, respectively, and wherein locating the central planes of the first and second flow restrictors within the same plane includes disposing the first and second disks in first and second openings, respectively, of a metal plate positioned between (i) the upstream portion of the main conduit and (ii) the intermediate portion, such that the first flow restrictor connects the upstream portion of the main conduit to the sensor tube and the second flow restrictor connects the upstream portion of the main conduit to the bypass tube.

* * * * *